United States Patent [19]

Covey

[11] Patent Number: 4,628,402
[45] Date of Patent: Dec. 9, 1986

[54] LIGHTNING PROTECTION OF FASTENERS IN COMPOSITE MATERIAL

[75] Inventor: James H. Covey, Snohomish

[73] Assignee: The Boeing Company, Seattle, Wash.

[21] Appl. No.: 782,226

[22] Filed: Sep. 30, 1985

[51] Int. Cl.$^4$ .............................................. H05F 1/02
[52] U.S. Cl. ................................................... 361/218
[58] Field of Search ............... 361/212, 216, 217, 218, 361/220; 244/1 A

[56] References Cited

U.S. PATENT DOCUMENTS

| Re. 25,417 | 7/1963 | Amason | 244/1 |
|---|---|---|---|
| 255,043 | 3/1882 | Smith | 174/2 |
| 1,883,076 | 10/1932 | Stough | 174/2 |
| 2,167,972 | 8/1939 | Crawford | 244/134 |
| 2,567,205 | 9/1951 | Hall | 250/33 |
| 3,480,231 | 11/1969 | Lumn | 244/1 |
| 3,482,802 | 12/1969 | Lumn | 244/1 |
| 3,498,572 | 3/1970 | Lumn | 244/1 |
| 3,528,165 | 9/1970 | Williams et al. | 29/470.1 |
| 3,906,308 | 9/1975 | Amason et al. | 317/2 |
| 3,923,421 | 12/1975 | Carter et al. | 416/224 |
| 3,965,285 | 6/1976 | Hill | 174/2 |
| 3,989,984 | 11/1976 | Amason et al. | 317/2 |
| 4,186,237 | 1/1980 | Propp | 428/323 |
| 4,237,514 | 12/1980 | Cline | 361/117 |
| 4,329,731 | 5/1982 | Meulenberg, Jr. | 361/218 |
| 4,479,163 | 10/1984 | Bannink, Jr. et al. | 361/218 |

FOREIGN PATENT DOCUMENTS 27574 3/1977 Japan ............................... 174/2

Primary Examiner—L. T. Hix
Assistant Examiner—Douglas S. Lee
Attorney, Agent, or Firm—Bruce A. Kaser

[57] ABSTRACT

An electrically conductive metal fastener (14) is positioned through an opening (22) in a first surface region (20) of a composite material (10). The first surface region (20) has a relatively low electrical conductivity. A conductive second surface region (32) of the composite material (10) is adjacent the first surface region (20) and is grounded. A film of dielectric material (30) covers the metal fastener (14) and an area immediately surrounding the fastener opening (22). The material (30) diverts a lightning strike away from the fastener (14) and to the conductive second surface region (32).

7 Claims, 5 Drawing Figures

LIGHTNING PROTECTION OF FASTENERS IN COMPOSITE MATERIAL

DESCRIPTION

1. Technical Field

This invention relates to lightning protection systems. More particularly, the invention relates to a system that prevents the conduction of lightning through a metal fastener which fastens a lightning-accessible composite skin member to another structural member.

2. Background Art

Lightning strike attachment to aircraft is a well-known problem. A very thorough presentation and discussion of the problem can be found in U.S. Pat. No. 3,906,308 issued to Amason et al on Sept. 16, 1975.

Research and development with regard to composite materials has resulted in an increased usage of these materials in aircraft. Composite materials have a high strength-to-weight ratio and can provide a reduction in the empty weight of an aircraft, which results in increased payload capacity. However, the use of composite materials on exterior or lightning-accessible surfaces has presented a special problem with regard to lightning attachment.

Some of the more recent aircraft or aerospace related designs contemplate using composite skin members on wing surfaces, fuel cells, and other lightning-accessible surfaces. Typically, a composite skin member is attached to an internal structural member such as a wing spar, for example, by means of a metal fastener or rivet. This can cause a lightning attachment problem because the composite skin member has a relatively low electrical conductivity in relation to the metal fastener. The metal fastener, positioned in the composite member and surrounded by the surface of the member, has a higher potential for receiving a lightning strike than the composite member. If lightning attaches directly to the fastener the lightning could be conducted through the fastener to internal structures. Further, even if the lightning did not attach directly to the fastener, it is possible the lightning could attach to a surface of the composite member and travel across the surface to the fastener where it would be conducted to internal structures. As an example, when metal fasteners are used in conjunction with composite skin members on wing surfaces, it is possible that an attached lightning strike could be conducted through the fastener and damage internal structure such as electrical wiring, mechanical or electronic hardware, or the like.

The principal object of the present invention is to prevent the attachment of a lightning strike to a metal fastener which is used to attach a lightning-accessible composite skin member to another member. The invention provides a system for diverting a lightning strike away from the fastener to other structural members which can tolerate lightning.

In addition to the above-cited Amason patent, patent literature pertinent to the present invention is as follows:

U.S. Pat. Nos.; Re. 25,417, granted to Amason; 255,043, granted to Smith; 1,883,076, granted to Stough; 2,167,972, granted to Crawford; 2,567,205, granted to Hall; 3,480,231, granted to Lumn; 3,482,802, granted to Lumn; 3,498,572, granted to Lumn; 3,528,165, granted to Williams; 3,923,421, granted to Carter; 3,965,285, granted to Hill; 3,989,984, granted to Amason; 4,186,237, granted to Propp; 4,237,514, granted to Cline; and 4,329,731, granted to Meulenberg.

DISCLOSURE OF THE INVENTION

In accordance with the present invention, a lightning accessible structural member made of a composite material is attached by a conductive metal fastener to another member. The composite member has a first region with a fastener opening wherein the metal fastener is positioned. The first region is characterized in that it has a lower electrical conductivity than the conductivity of the fastener. The composite member also has a second region which presents a lightning accessible surface and is characterized in that such region has a higher electrical conductivity than the first region. Typically, for example, the second and first regions respectively may be in the form of a metal-impregnated cloth attached to a graphite/epoxy matrix, with the cloth providing a lightning accessible surface by making up the exterior surface of the matrix.

A layer of dielectric material is positioned between the fastener and the second region, in a manner such that the dielectric material prevents lightning from attaching to the fastener by diverting the lightning to the conductive second region. The second region is or may be grounded to surrounding surfaces which have the ability to tolerate lightening strikes without damage.

The film of lightning strike diverting material must be thick enough to divert a lightning strike having an electrical potential of approximately 30,000 volts. In addition, in those embodiments of the invention wherein a plurality of fasteners are used to attach a composite material to another structural member, the lightning strike diverting material may be in two forms. One form consists of a plurality of separate circular patches of dielectric material, each of which covers a separate fastener. The other form consists of a continuous strip of dielectric material covering an entire row of fasteners.

BRIEF DESCRIPTION OF THE DRAWINGS

Like reference numerals are used to designate like parts throughout the several views, and.

BEST MODE FOR CARRYING OUT THE INVENTION

Figure 1:
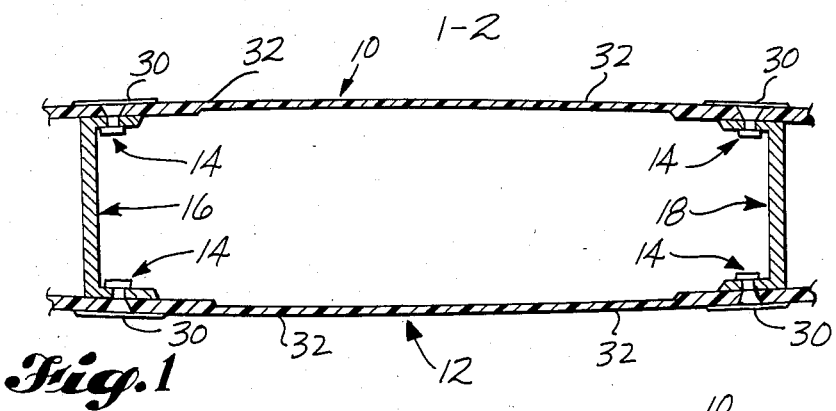
FIG. 1 is a fragmentary sectional view showing two exterior composite skin members attached by metal fasteners or rivets to a pair of U-shaped or channel beam members.

Referring now to the drawings, therein is shown in FIG. 1 a pair of exterior skin members 10, 12 attached by metal fasteners 14 to a pair of U-shaped or channel beam members 16, 18. The surfaces of skin members 10, 12 present lightning-accessible surfaces which are susceptible to lightning strike attachment. By way of example, the arrangement shown in FIG. 1 could represent a portion of an aircraft wing. Skin members 10, 12 would represent exterior surfaces of the wing, and channel beam members 16, 18 would represent wing spars positioned inside the wing. Typically, the skin members 10, 12 are constructed of a composite material such as graphite/epoxy, or the like. The fasteners 14 are in the form of metal rivets. The channel beam members 16, 18 may be made of metal, or alternatively, they may be made of a composite material similar to that used for the skin members 10, 12.

Figure 2:
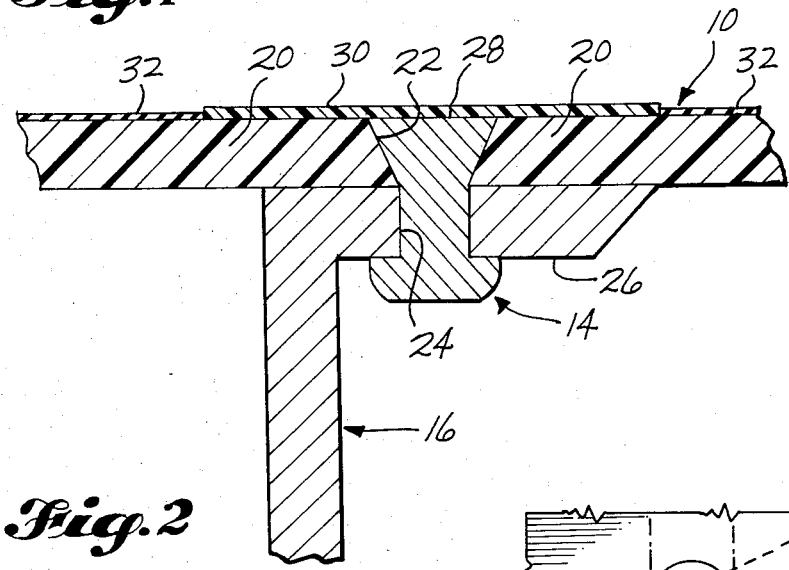
FIG. 2 is an enlarged fragmentary sectional view of the upper left hand corner of FIG. 1, and shows a film of lightning strike diverting material on the surface of the skin member and covering the head of a metal fastener.

Directing attention now to FIG. 2, therein is shown a first embodiment of the invention wherein skin member 10 includes a first region 20 and a second region 32. The construction shown is typical of many composite materials wherein the first region 20 could be a graphite/epoxy matrix, and the second region 32 could be a layer of graphite cloth covering the matrix. In preferred form, the graphite cloth is metal impregnated with nickel, for example, to make it highly conductive.

Region 20 has a relatively low electrical conductivity when compared to a metal fastener, and includes a fastener opening 22 for receiving a fastener. The fastener opening 22 is aligned with an opening 24 in a flange portion 26 of channel beam member 16. A metal fastener or rivet 14 is positioned in both the fastener opening 22 and the flange opening 24, and connects the skin member 10 to the flange 26.

In the embodiment shown in FIG. 2 the top or head surface 28 of the fastener 14 is substantially flush with the surface of the first region 20. A film or layer of dielectric material 30 covers the head 28 of the fastener 14 and further covers some of the area surrounding the fastener opening 22. The second conductive region 32 does not cover some of the first region 20 immediately adjacent the fastener opening 22. Instead, the dielectric material 30 covers the region 20 a certain distance away from the fastener opening.

A suitable material for use as a dielectric material is Kapton ™ which is manufactured by the Dupont Company. A Kapton ™ film or layer of Kapton ™ could be adhesively bonded directly to the first surface region 20, for example.

In one embodiment of the invention the region 32 extends to the edge of the dielectric material 30 in the manner shown in FIG. 2. Since surface region 32 is conductive it can be grounded to lightning tolerant structures for diverting an attached lightning strike to those structures.

Figure 4:
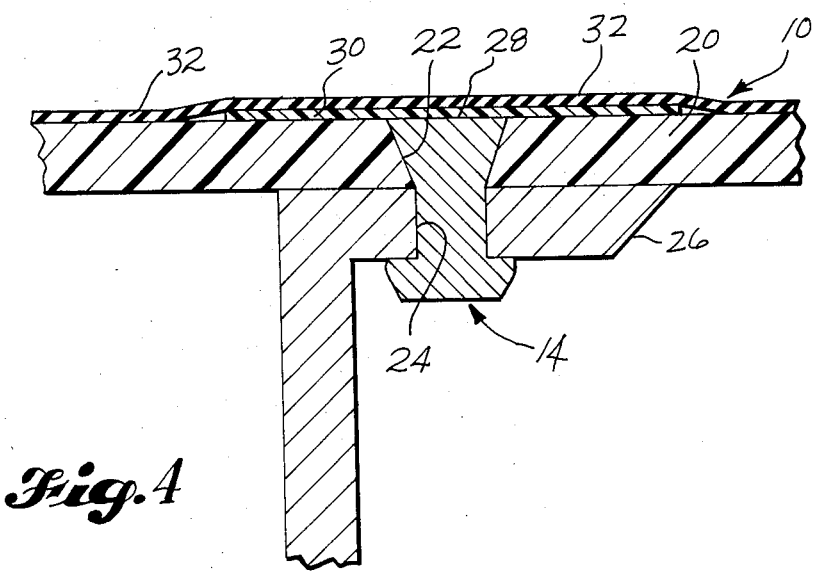
FIG. 4 is a view much like FIG. 2, but shows a film of lightning strike diverting material positioned between an exterior and an interior layer of a composite skin member, in a manner so as to electrically insulate the head of the metal fastener from the exterior layer.

In another embodiment of the invention, shown in FIG. 4, the second region 32 may extend over and cover the dielectric material 30. In this embodiment, the first region 20 is first attached to the flange 26 by the fastener 14. The layer of dielectric material 30 is then attached to the first region 20 and covers the head 28 of the fastener. The second region 32 is then attached to the first region 20 as a layer making up the exterior surface of the skin member 10. The dielectric material 30 is positioned between the conductive layer 32 and the first region 20 thereby separating the conductive layer from the fastener 14 so that lightning attached to the exterior surface of the skin member cannot spread from the second region 32 to the fastener in sufficient time to enable a spark to occur as the current and voltage levels are mollified with time.

The dielectric material 30 must be sufficiently thick to divert a lightning strike. In the embodiments shown in FIGS. 2-4, the dielectric material 30 covers the head surface 28 of fastener 14, and it also covers an area surrounding the fastener opening 22. The thickness and radius of the material 30 in these embodiments must be sufficient so that any lightning attaching to the skin member 10 cannot spread to the fastener.

Theoretical calculations show that in order to accomplish the above prerequisites, the dielectric material 30 must extend at least 2.0 inches away from the edge of the head 28 of the fastener 14. This insures that a lightning strike which attaches to skin member 10 at the edge of dielectric material 30 (essentially at the point where surface region 32 meets surface region 20 in FIG. 2) will not spread from the point of attachment to the fastener.

The thickness of the dielectric material 30 must be sufficient to divert a lightning strike having an electric potential of approximately 30,000 volts. As was mentioned earlier, Kapton is a preferred dielectric material. If Kapton is used, the required thickness of the Kapton is calculated by the following equation: $t = R \times G_a / G_d$;

wherein R = the distance from the edge of the fastener head (2.0 inches);

$G_a$ = the breakdown gradient of air (30,000 volts/inch);

$G_d$ = the breakdown gradient of the dielectric material ($7 \times 10^6$ volts/inch for Kapton); and t = the thickness of the dielectric material.

By way of example, applying the above equation to a dielectric material made of Kapton shows that a minimum theoretical thickness of approximately 0.008" is required.

Figure 5:
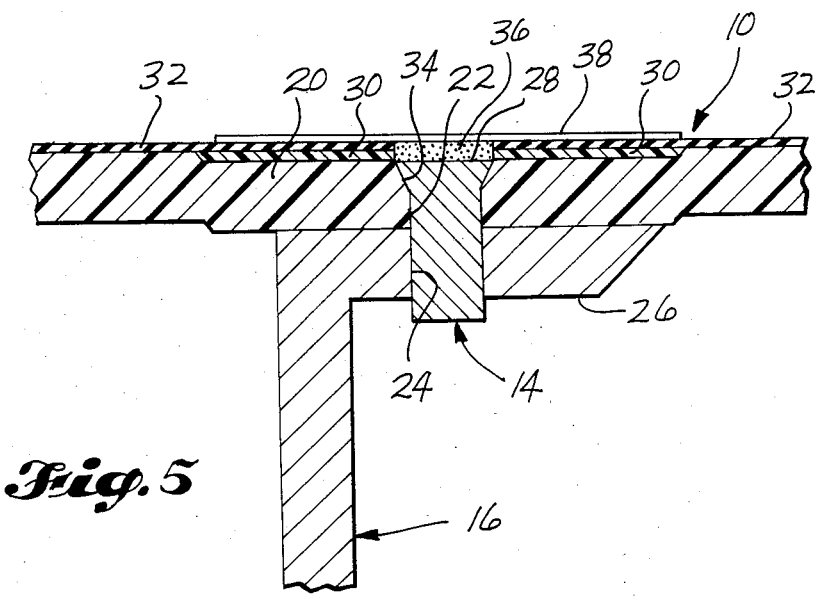
FIG. 5 is a view much like FIG. 4, but shows a metal fastener connecting a composite skin member to another member, wherein the fastener is received within a counter sunk bore extending through the skin member.

Still another embodiment of the invention is shown in FIG. 5. In this embodiment, the composite skin member 10 is constructed by attaching or curing the second region 32 to the first region 20. The dielectric material 30 is also co-cured with the second region 32 in or as a portion of the first region 20. A fastener opening is then bored through both regions and the dielectric material down into the flange 26. The fastener opening 22 has a countersunk portion 34 located a certain distance below the second surface region 32. The countersunk portion 34 receives the head of the fastener 14. The surface of the fastener head 28 and the fastener opening 22 form a recess in the skin member 10 which is filled with a plug of dielectric material 36. In preferred form, the plug is made of polysulfide rubber. However, there are many other suitable materials which could also be used. The plug extends from the fastener surface 28 flush with the bottom of the dielectric layer 30 to the top of the exterior surface of the second region 32. Covering the top of the plug 36, and the surface area adjacent the plug, is a thin sheet of copper 38. The copper sheet dissipates the charge of a lightning strike attached to the sheet. Of course, other materials could be substituted for the copper. The dielectric plug 36 must be of sufficient thickness to prevent lightning from spreading from either the copper sheet 38 or the second region 32 to the fastener 14. This latter embodiment operates functionally in the same manner as the embodiments shown in FIGS. 2-4. In all cases, a dielectric material is used to electrically divert from a fastener an electric charge resulting from a lightning strike. The strike is diverted a sufficient time to allow the voltage and current levels of the strike to be mollified.

Figure 3:
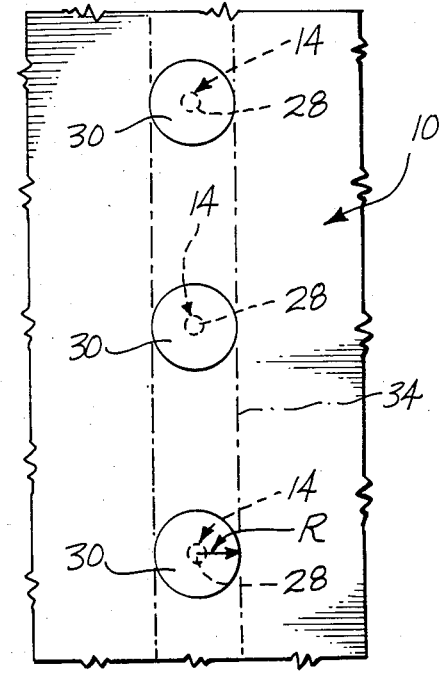
FIG. 3 is a fragmentary view of a lightning-accessible surface of a composite skin member, such as the upper skin member shown in FIG. 1, and shows a plurality of metal fasteners in a row, each of which is covered by a separate circular patch of lightning strike diverting material.

Referring now to FIG. 3, therein is shown a plurality of fasteners for rivets 14 positioned in skin member 10. In this embodiment, a strip of dielectric material, indicated by the dash-dot-dash line 34 covers the row of fasteners 14. The strip 34 has the same thickness and radius as the material 30 shown in FIGS. 2 and 4. However, in this latter embodiment the strip 34 is shown positioned between the first region 20 and the second region 32, the latter region makes up the exterior surface of the member 10.

The configurations illustrated and described herein are provided for the purpose of better explaining the invention and for providing an exemplary embodiment of the invention. However, the above description is not to be used for the purpose of limiting the invention. Rather, the scope of the invention is to be determined and limited solely by the appended claims which follow, as interpreted by established doctrines of patent claim interpretation.

What is claimed is:

1. For a lightning accessible skin member made of a composite material and having a relatively low electrical conductivity, said skin member being attached to another member by a fastener having a relatively high electrical conductivity, said fastener extending through a bore in said skin member and having a head portion positioned in substantially flush relationship with the other surface of said skin member, a system for diverting a lightning strike away from said fastener, comprising:
   a conductive layer of material on the outer surface of said skin member, said conductive layer extending across said surface to at least within a certain preselected distance from and about said fastener's head portion, to define a border region on said skin member's outer surface having a relatively low conductivity which surrounds said head portion; and
   a layer of dielectric material covering said head portion and said border region, said dielectric layer extending away from said head portion across said border region, wherein the edge of said dielectric layer is in meeting relationship with the edge of said conductive layer, to divert a lightning strike from said fastener and to said conductive layer.

2. The system according to claim 1, wherein said preselected distance is at least 2.0 inches.

3. The system according to claim 1, wherein said layer of dielectric material is thick enough to divert a lightning strike having a voltage of at least 30,000 volts.

4. The system according to claim 1, wherein said layer of dielectric material is in the form of a Kapton TM film.

5. For a lightning accessible skin member made of a composite material, and attached to another member by an electrically conductive fastener, a system for diverting a lightning strike away from the fastener, comprising:
   a first region of said skin member, said first region being characterized in that said first region is of a lower electrical conductivity than the conductivity of said fastener;
   a second region of said skin member, said second region being characterized in that said second region has a higher electrical conductivity than the electrical conductivity of said first region, said second region being positioned adjacent said first region with said second region providing a lightning accessible outer surface of said skin member;
   a layer of dielectric material positioned between said first and second regions;
   a fastener opening extending through said second region, said dielectric material and said first region, said dielectric material extending away from said fastener opening and extending between said first and second regions a certain preselected distance from said opening, said fastener opening having a countersunk portion, said countersunk portion extending downwardly from said outer surface a certain distance into said first region, said fastener having a head portion received in said countersunk portion, wherein said head portion is positioned below said second region and below said dielectric material, to form a recess in said skin member, said recess being filled with a plug of another dielectric material; and
   a thin layer of copper covering said filled recess and an area of said second region immediately surrounding said opening.

6. The system according to claim 5, wherein said second region comprises a metal-impregnated graphite cloth.

7. The system according to claim 6, wherein said other dielectric material filling said recess is polysulfide rubber.

* * * * *

UNITED STATES PATENT AND TRADEMARK OFFICE
CERTIFICATE OF CORRECTION

PATENT NO. : 4,628,402

DATED : December 9, 1986

INVENTOR(S) : James H. Covey

It is certified that error appears in the above-identified patent and that said Letters Patent are hereby corrected as shown below:

Claim 1, column 5, line 34, "other" should be -- outer --.

Signed and Sealed this

Twenty-first Day of April, 1987

Attest:

DONALD J. QUIGG

Attesting Officer

Commissioner of Patents and Trademarks